United States Patent
Utsumi et al.

(10) Patent No.: US 8,710,388 B2
(45) Date of Patent: Apr. 29, 2014

(54) SWITCHGEAR AND METHOD FOR OPERATING SWITCHGEAR

(75) Inventors: Tomoaki Utsumi, Hitachi (JP); Takashi Shirone, Hitachi (JP); Takashi Sato, Mito (JP); Kenji Tsuchiya, Hitachi (JP); Ayumu Morita, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 371 days.

(21) Appl. No.: 12/854,659

(22) Filed: Aug. 11, 2010

(65) Prior Publication Data

US 2011/0036811 A1 Feb. 17, 2011

(30) Foreign Application Priority Data

Aug. 12, 2009 (JP) ................................. 2009-186985

(51) Int. Cl.
*H01H 33/66* (2006.01)
*H02B 13/02* (2006.01)
*H02B 13/075* (2006.01)

(52) U.S. Cl.
USPC .......................................... 218/120; 218/140

(58) Field of Classification Search
CPC ....... H01H 33/66; H01H 33/56; H01H 33/02; H01H 33/666; H02B 13/02; H02B 13/035; H02B 13/075
USPC ........... 218/2–7, 9, 10, 12–14, 118–120, 140, 218/152–154

See application file for complete search history.

(56) References Cited

U.S. PATENT DOCUMENTS

| | | | | |
|---|---|---|---|---|
| 5,828,025 A | * | 10/1998 | Neumaier et al. | 218/79 |
| 6,426,627 B2 | | 7/2002 | Kikukawa et al. | |
| 6,897,396 B2 | * | 5/2005 | Ito et al. | 218/120 |
| 2008/0110738 A1 | * | 5/2008 | Vaghini et al. | 218/119 |
| 2008/0308531 A1 | | 12/2008 | Tsuchiya et al. | |
| 2009/0020507 A1 | | 1/2009 | Kurogi et al. | |
| 2009/0134125 A1 | * | 5/2009 | Inoue et al. | 218/139 |
| 2009/0250435 A1 | | 10/2009 | Yoshitake et al. | |

FOREIGN PATENT DOCUMENTS

| | | |
|---|---|---|
| CN | 1139305 A | 1/1997 |
| CN | 1173727 A | 2/1998 |
| CN | 1442939 A | 9/2003 |
| DE | 296 08 127 U1 | 7/1996 |
| EP | 0 564 057 A1 | 10/1993 |
| EP | 0 843 330 A2 | 5/1998 |
| EP | 1 343 233 A2 | 9/2003 |
| EP | 1343233 A2 | 9/2003 |
| EP | 1 693 873 A2 | 8/2006 |

(Continued)

OTHER PUBLICATIONS

Japanese Office Action dated Oct. 18, 2011 (one (1) page).

(Continued)

*Primary Examiner* — Amy Cohen Johnson
*Assistant Examiner* — Marina Fishman
(74) *Attorney, Agent, or Firm* — Crowell & Moring LLP

(57) ABSTRACT

A switchgear includes an earthing and disconnecting switch which linearly moves and is switchable to a disconnecting and an earthing positions, a vacuum valve which performs closing and breaking of a current in a vacuum container producing vacuum inside, and a solid insulator with which the earthing and disconnecting switch and the vacuum valve are covered, therein the earthing and disconnecting switch and the vacuum valve are electrically connected, and closing and breaking of a current is performed in the vacuum valve.

17 Claims, 20 Drawing Sheets

(56) References Cited

FOREIGN PATENT DOCUMENTS

| EP | 1 959 471 A1 | 8/2008 |
|---|---|---|
| EP | 2 017 866 A1 | 1/2009 |
| EP | 2 073 331 A2 | 6/2009 |
| GB | 1156919 | 7/1969 |
| JP | 6-12948 A | 1/1994 |
| JP | 2001-176364 A | 6/2001 |
| JP | 2003-308767 A | 10/2003 |
| JP | 2007-312507 A | 11/2007 |
| WO | WO 2006/067936 A1 | 6/2006 |

OTHER PUBLICATIONS

The Extended European Search Report dated Jan. 16, 2012 (Six (6) pages).
Chinese Office Action dated Feb. 5, 2013 (8 pages).
European Search Report Dated Aug. 2, 2013 (Six (6) pages).

* cited by examiner

SWITCHGEAR AND METHOD FOR OPERATING SWITCHGEAR

BACKGROUND OF THE INVENTION (1) Field of the Invention

The present invention relates to an electrical switchgear including an air-insulated earthing and disconnecting switch which performs earthing and disconnecting by air insulation.

The present invention also relates to a method for closing, breaking, disconnecting and earthing of voltage/current of the switchgear.

(2) Description of the Related Art

An example of the conventional switchgear will be described with reference to the configuration of the cubicle-type gas-insulated switchgear described in JP-A-6-12948. The switchgear includes a three-position earthing and disconnecting switch with a rotor as a contactor and a vacuum valve in a metal container. One end of the three-position earthing and disconnecting switch is connected to the vacuum valve, and the other end is connected to a high-voltage cable via a bushing bus and a bushing. Further, the other end of the vacuum valve to which the three-position earthing and disconnecting switch is not connected is connected to a bus via the bushing bus and the bushing, and electrically connected to an adjacent switchboard.

In the present configuration, when the rotor of the three-position earthing and disconnecting switch is closed to the bus side and the vacuum valve is further closed, the bus and the cable are electrically continued, and then power is supplied to the cable from the bus.

BRIEF SUMMARY OF THE INVENTION

However, in the conventional cubicle-type gas-insulated switchgear, the vacuum valve and the three-position earthing and disconnecting switch are provided inside the metal container in which $SF_6$ gas is sealed. Therefore, a bushing of an epoxy resin with high hermeticity, which is a separate component, is required in order to be connected to the cable. Further, an O-ring, an O-ring groove and the like for keeping hermeticity between the bushing and the metal container are required. Thus, the number of components is large, and the configuration is complicated. Further, $SF_6$ gas with a high global warming potential is used as an insulation medium. Therefore, there arises the problem of low environmental conformity.

On the other hand, in the case of air insulation with a low insulation performance as compared with $SF_6$ gas, the size of the earthing and disconnecting switch becomes large if the method of switching with the rotor is adopted. Thus, there arises the problem of increasing the size of the entire device. In the case of $SF_6$ gas insulation, there hardly arises the problem of increase in size even though the method of switching with the rotor is adopted, since $SF_6$ gas has favorable insulation performance.

The present invention is made based on the aforementioned matter. An object of the present invention is to provide a switchgear achieving reduction in size even when air insulation is adopted. Further, another object of the present invention is to provide a method for operating the switchgear achieving reduction in size even when air insulation is adopted.

The switchgear of the present invention includes an air-insulated earthing and disconnecting switch which linearly moves and is switchable to three positions of closing, disconnecting and earthing, a vacuum valve which performs closing and disconnecting of voltage/current in a vacuum container producing vacuum inside, and a solid insulator with which the air-insulated earthing and disconnecting switch and the vacuum valve are covered. The air-insulated earthing and disconnecting switch and the vacuum valve are electrically connected, and closing and breaking of current/voltage are performed in the vacuum valve.

Further, in a method for operating a switchgear according to the present invention, closing of voltage/current of a high-voltage circuit such as a cable is performed by closing the vacuum valve after electrically continuing the air-insulated earthing and disconnecting switch, breaking of voltage/current is performed by breaking the vacuum valve with the air-insulated earthing and disconnecting switch electrically continued, disconnecting of the high-voltage circuit is performed by switching the air-insulated earthing and disconnecting switch to a disconnecting position after the voltage/current is broken, and earthing of the high-voltage circuit is performed by switching the air-insulated earthing and disconnecting switch to an earthing position and further closing the vacuum valve, after the high voltage circuit is disconnected.

According to the present invention, a switchgear is provided, which does not increase in size even when the air-insulated earthing and disconnecting switch is used. Further, the method for operating the switchgear is provided, which achieves reduction in size even when air insulation is adopted.

Other objects, features and advantages of the invention will become apparent from the following description of the embodiments of the invention taken in conjunction with the accompanying drawings.

DETAILED DESCRIPTION OF THE INVENTION

Figure 1:
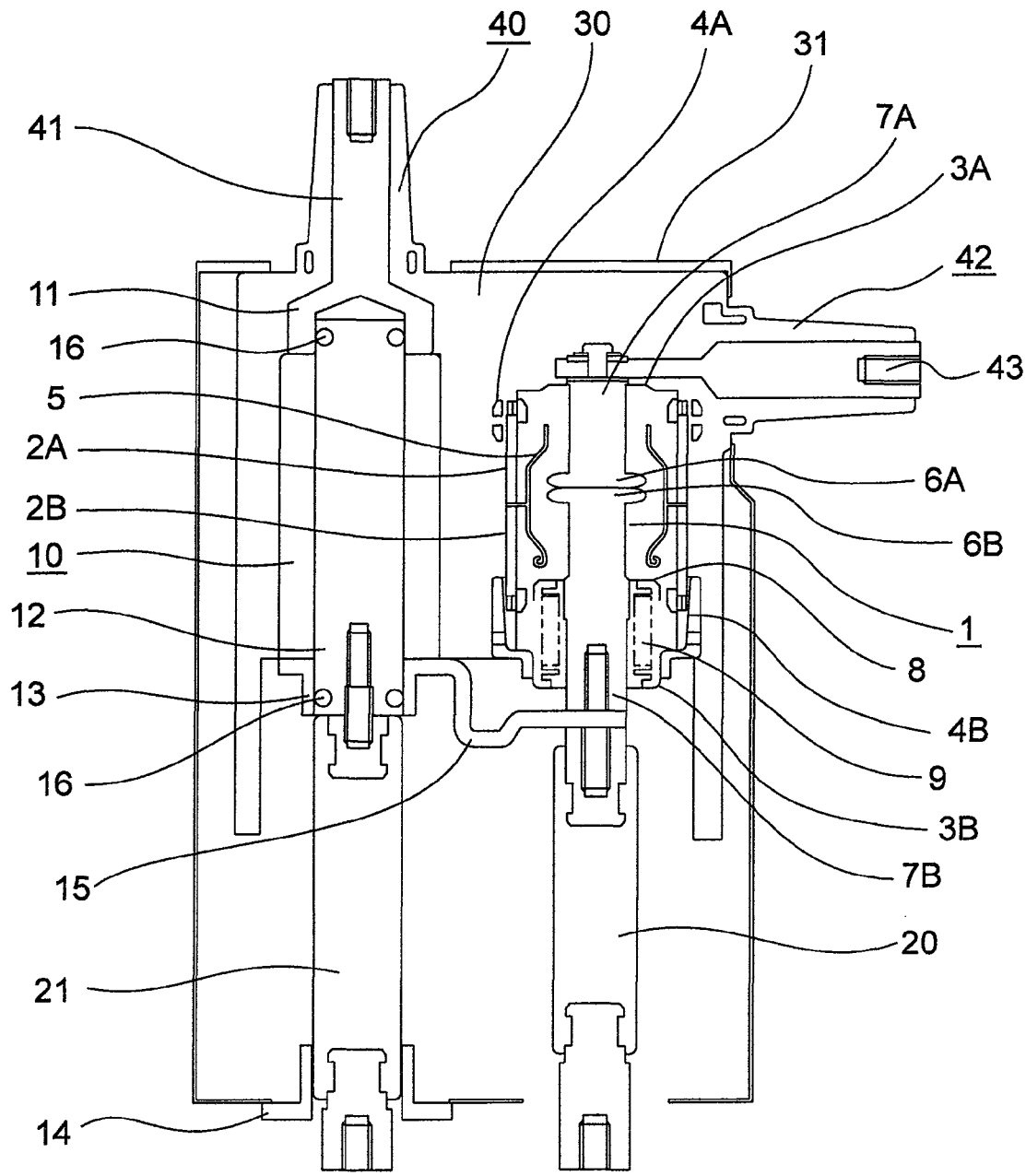
FIG. 1 is a sectional front view showing a first embodiment of a switchgear of the present invention in a closing mode of voltage/current.

Hereinafter, a first embodiment of a switchgear of the present invention will be described with reference to FIGS. 1 to 6. A switch unit of the switchgear in the present embodiment is comprised of a vacuum valve 1, an earthing and disconnecting switch 10, a bus bushing 40 and a cable bushing 42, which are provided in an earthed metal container 31 and are integrally casted with a solid insulator 30 of epoxy or the like.

The vacuum valve 1 has a fixed side electrode 6A, a movable side electrode 6B, a fixed side holder 7A connected to the fixed side electrode 6A, a movable side holder 7B connected to the movable side electrode 6B and an arc shield 5 for protecting a ceramics insulating cylinder from arc, arranged in a vacuum container comprised of a fixed side ceramics insulating cylinder 2A, a movable side ceramics insulating cylinder 2B, a fixed side end plate 3A and a movable side end plate 3B. The fixed side holder 7A is connected to a cable bushing center conductor 43 so that power can be supplied to a load side. Further, a bellows 9 is disposed at the movable side for achieving the movability of the movable side holder 7B. The vacuum valve 1 switches between closing mode and breaking mode by moving the movable side electrode 6B and the movable side holder 7B in the axial direction while maintaining vacuum of the inside with the bellows 9 connected to the movable side end plate 3B and the movable side holder 7B. A bellows shield 8 is provided in the vicinity of the connecting portion of the bellows 9 and the movable side electrode 6B so as to protect the bellows 9 from arc and the like produced during the open-close operation. Also, the bellows shield 8 can relieve concentration of the electric field in the bellows end portion. A fixed side electric field relief shield 4A is disposed around the fixed side ceramics insulating cylinder 2A to relieve concentration of the electric field in the connecting portion to the fixed side end plate 3A. A movable side electric field relief shield 4B is disposed around the movable side ceramics insulating cylinder 2B to relieve concentration of the electric field in the connecting portion to the movable side end plate 3B.

The earthing and disconnecting switch 10 includes a bushing side fixed electrode 11 which is connected to a bush side via a bus bushing center conductor 41, an earthing side fixed electrode 14 which is set at ground potential, and an intermediate fixed electrode 13 which is located midway between the bushing side fixed electrode 11 and the earthing side fixed electrode 14, and electrically connected to the movable side holder 7B at the vacuum valve side via a flexible conductor 15. The inside of the earthing and disconnecting switch 10 is air insulated. Further, these respective fixed electrodes are linearly disposed, and the inside diameters of them are equal to each other. A movable electrode 12 of the earthing and disconnecting switch linearly moves in the earthing and disconnecting switch 10 with respect to these respective fixed electrodes, and thereby, the earthing and disconnecting switch 10 can be switched to three positions of closing, disconnecting and earthing. The movable electrode 12 of the earthing and disconnecting switch is connected to an operation rod 21 of the earthing and disconnecting switch, which is connected to a not-illustrated operation mechanism. Therefore, the movable electrode 12 of the earthing and disconnecting switch can be moved. The contact portion of the movable electrode 12 of the earthing and disconnecting switch, coming in contact with the aforementioned respective fixed contact electrodes are configured by spring contact points 16. Thereby, the movability of the movable electrode 12 of the earthing and disconnecting switch is not hindered, and more reliable contact can be obtained by elastic force.

The switch unit of the switchgear of FIG. 1 is comprised of the vacuum valve 1 having at least a pair of separable contact points, the earthing and disconnecting switch 10, the cable bushing 42 which is connected to the fixed side of the vacuum valve 1, the bus bushing 40 which is connected to the bushing side fixed electrode 11 of the earthing and disconnecting switch 10, the flexible conductor 15 which connects the intermediate fixed electrode 13 of the earthing and disconnecting switch 10 with the movable side of the vacuum valve 1, the operation rod 20 of the vacuum valve which is mechanically connected to the movable side electrode 7B of the vacuum valve, and the operation rod 21 of the earthing and disconnecting switch which is mechanically connected to the movable electrode 12 of the earthing and disconnecting switch. The earthing and disconnecting switch 10 is provided in the atmosphere and includes the movable electrode 12 of the earthing and disconnecting switch which can be linearly displaced to three positions, the bushing side fixed electrode 11 and the intermediate fixed electrode 13 which are electrically continued via the movable electrode in the closing position of the movable electrode, and the earthing side fixed electrode 14 which is electrically continued to the intermediate fixed electrode 13 via the movable electrode in the earthing position of the movable electrode. The vacuum valve 1, the bushing side fixed electrode 11 of the earthing and disconnecting switch, the bus bushing 40 and the cable bushing 42 are integrally casted with the solid insulator 30.

The bus bushing 40 is configured by covering the periphery of the bus bushing center conductor 41 with the solid insulator 30. The cable bushing 42 is configured by covering the periphery of the cable bushing center conductor 43 with the solid insulator 30.

The operation of the first embodiment of the switchgear of the present invention configured as above will be described with reference to FIGS. 2 to 6.

Figure 2:
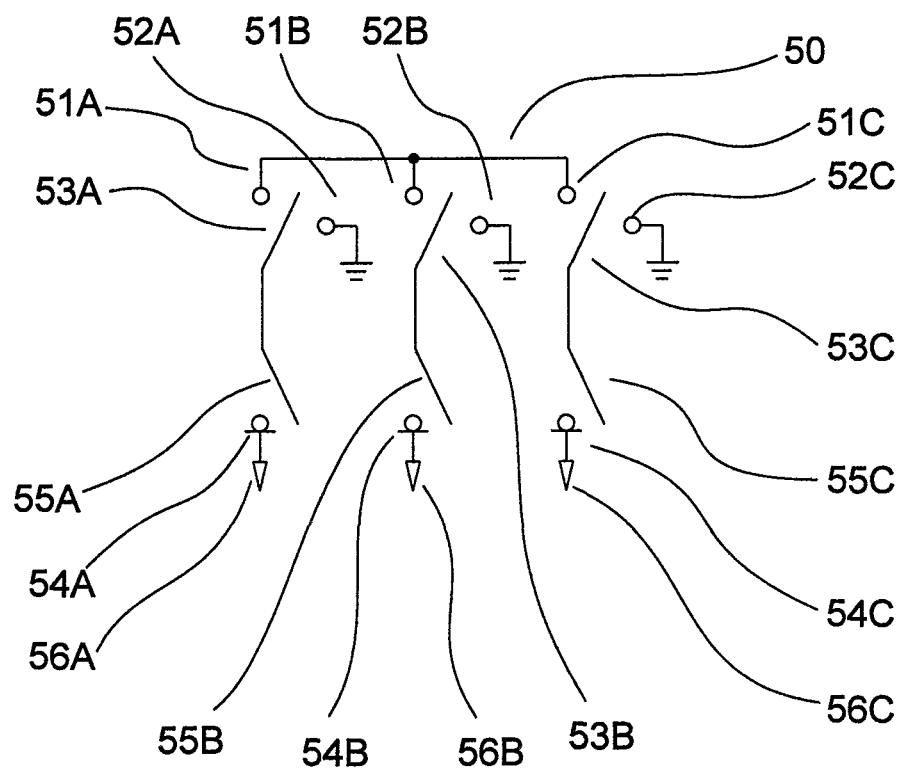
FIG. 2 is a single-line diagram for explaining an operation of the switchgear of the present invention shown in FIG. 1.

FIG. 2 is a single-line diagram for explaining the operation of the first embodiment of the switchgear of the present invention. Three switch units with the configurations of FIG. 1 are connected by a common bus 50. The common bus 50 is connected to the bus bushing 40, and thereby, a three-circuit switch is configured. In FIG. 2, the bushing side fixed electrode 11 of the earthing and disconnecting switch of FIG. 1 corresponds to the fixed contact points 51A, 51B and 51C of the earthing and disconnecting switch. The movable electrode 12 of the earthing and disconnecting switch of FIG. 1 corresponds to the movable contact points 53A, 53B and 53C of the earthing and disconnecting switch. The earthing side fixed electrode 14 of the earthing and disconnecting switch of FIG. 1 corresponds to the earthing contact points 52A, 52B and 52C of the earthing and disconnecting switch. The fixed side electrode 6A of the vacuum valve 1 of FIG. 1 corresponds to the fixed contacts 54A, 54B and 54C of the current switches. The movable side electrode 6B corresponds to the movable contacts 55A, 55B and 55C of the current switches. Cable heads 56A, 56B and 56C are connected to the cable bushing 42. When the movable contacts 55A, 55B and 55C of the current switches are closed by being switched to the closing position after the movable contacts 53A, 53B and 53C of the earthing and disconnecting switches are switched to the closing position, the common bus 50 and the respective cable heads 56A, 56B and 56C are electrically connected, and the power at the bus side, for example, can be supplied to the load side. At the time of disconnecting, the current is firstly broken by the movable contacts 55A, 55B and 55C of the current switches, and thereafter, the movable contacts 53A, 53B and 53C of the earthing and disconnecting switches are switched to the disconnecting position. At the time of earthing, the movable contacts 53A, 53B and 53C of the earthing and disconnecting switches are further switched to the earthing position from the position at the time of disconnecting, and the movable contacts of the current switches are switched to the closing position, and then earthing can be achieved.

Figure 3:
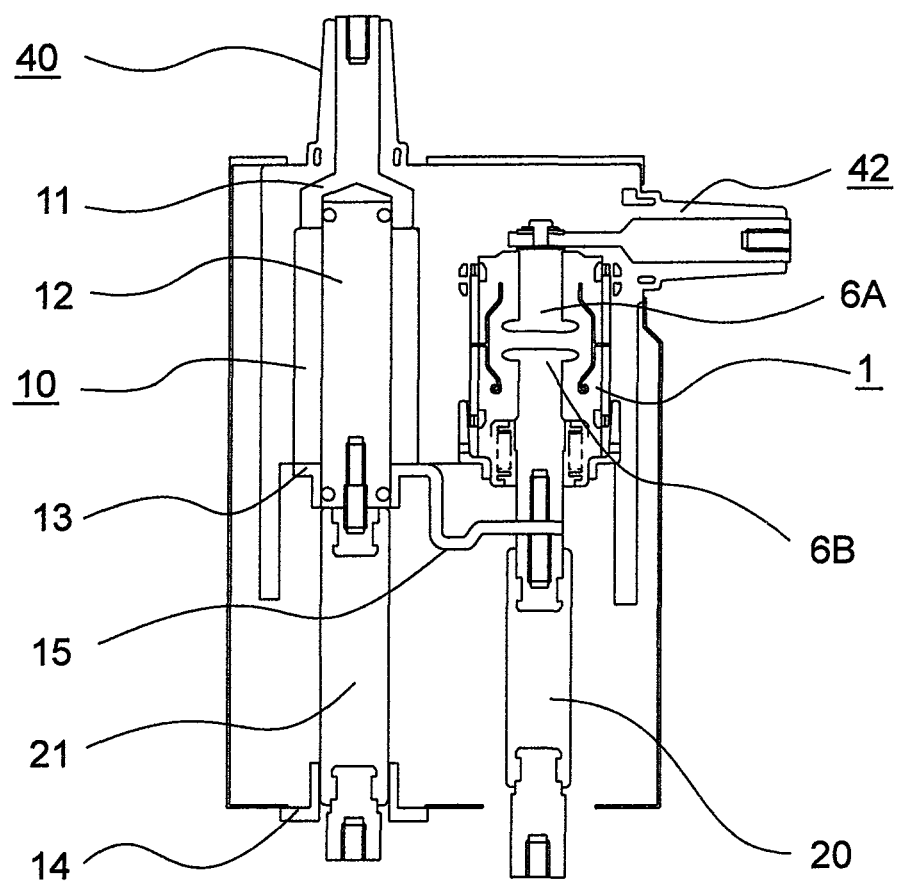
FIG. 3 is a front sectional view for explaining an operation in a breaking mode of the switchgear of the present invention shown in FIG. 1.

FIG. 3 shows a breaking mode. In the closing mode shown in FIG. 1, load current flows from the bus bushing 40 to the cable bushing 42 via the earthing and disconnecting switch 10 and the vacuum valve 1. When a short-circuit occurs in this mode at the load side which is connected to the cable bushing, and then a large fault current flows, the fault current is broken by breaking the vacuum valve 1 as shown in FIG. 3.

Figure 4:
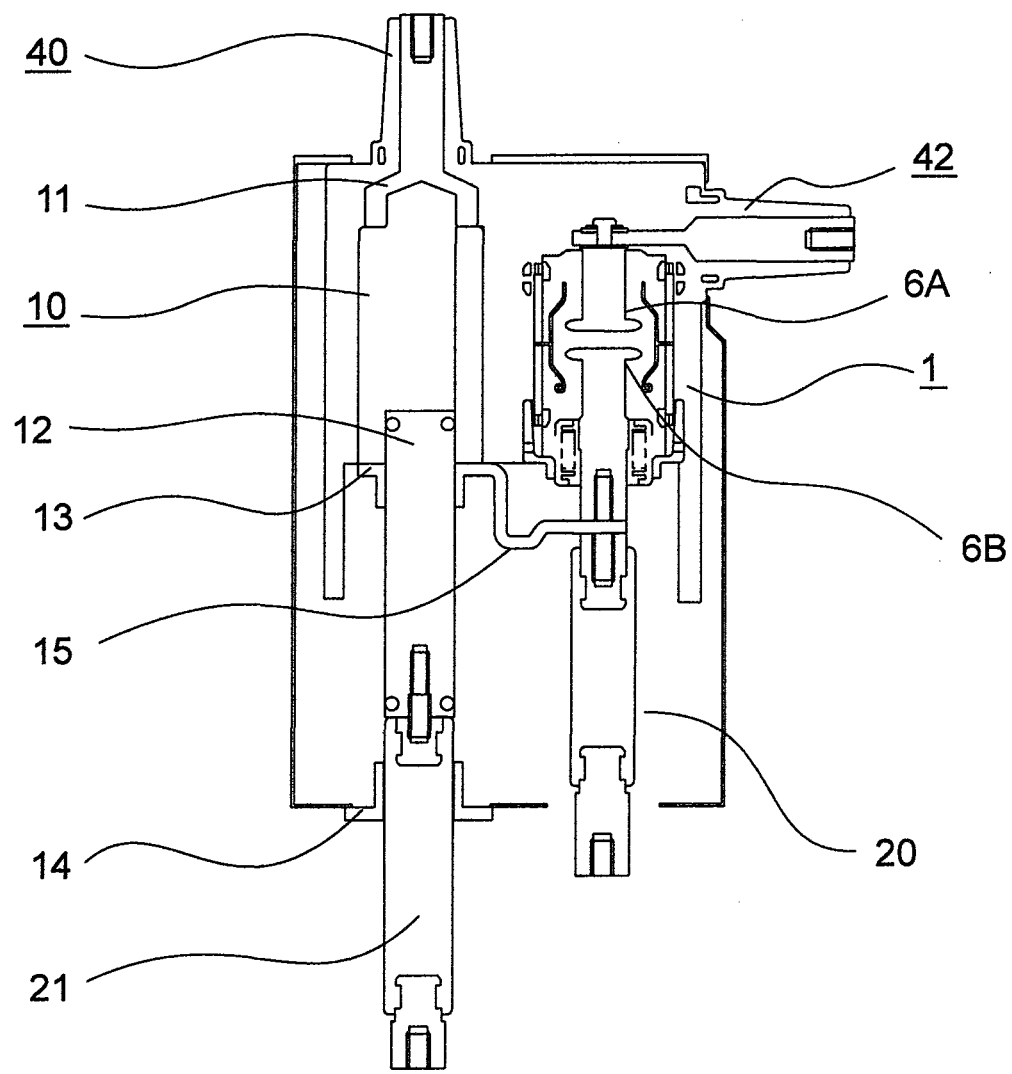
FIG. 4 is a sectional front view for explaining an operation in a disconnecting mode of the switchgear of the present invention shown in FIG. 1.

FIG. 4 shows a disconnecting mode. The disconnecting mode is produced by driving the movable electrode 12 of the earthing and disconnecting switch to the lower side of the drawing to the position where the movable electrode 12 of the earthing and disconnecting switch and the bushing side fixed electrode 11 are not electrically continued, and the movable electrode 12 of the earthing and disconnecting switch and the earthing side fixed electrode 14 are not continued, and a gap between the movable electrode 12 of the earthing and disconnecting switch and the bushing side fixed electrode 11 is large, and a gap between the movable electrode 12 of the earthing and disconnecting switch and the earthing side fixed electrode 14 is small.

At this mode, the bus bushing 40 and the cable bushing 42 are disconnected at two points of the vacuum valve 1 and the earthing and disconnecting switch 10. Therefore, high reliability is obtained. Further, by designing the withstand voltage between the movable electrode 12 of the earthing and disconnecting switch and the earthing side fixed electrode 14 to be lower than the withstand voltage between the fixed side electrode 6A and the movable side electrode 6B of the vacuum valve 1, a highly reliable structure with ground preference can be provided.

Figure 5:
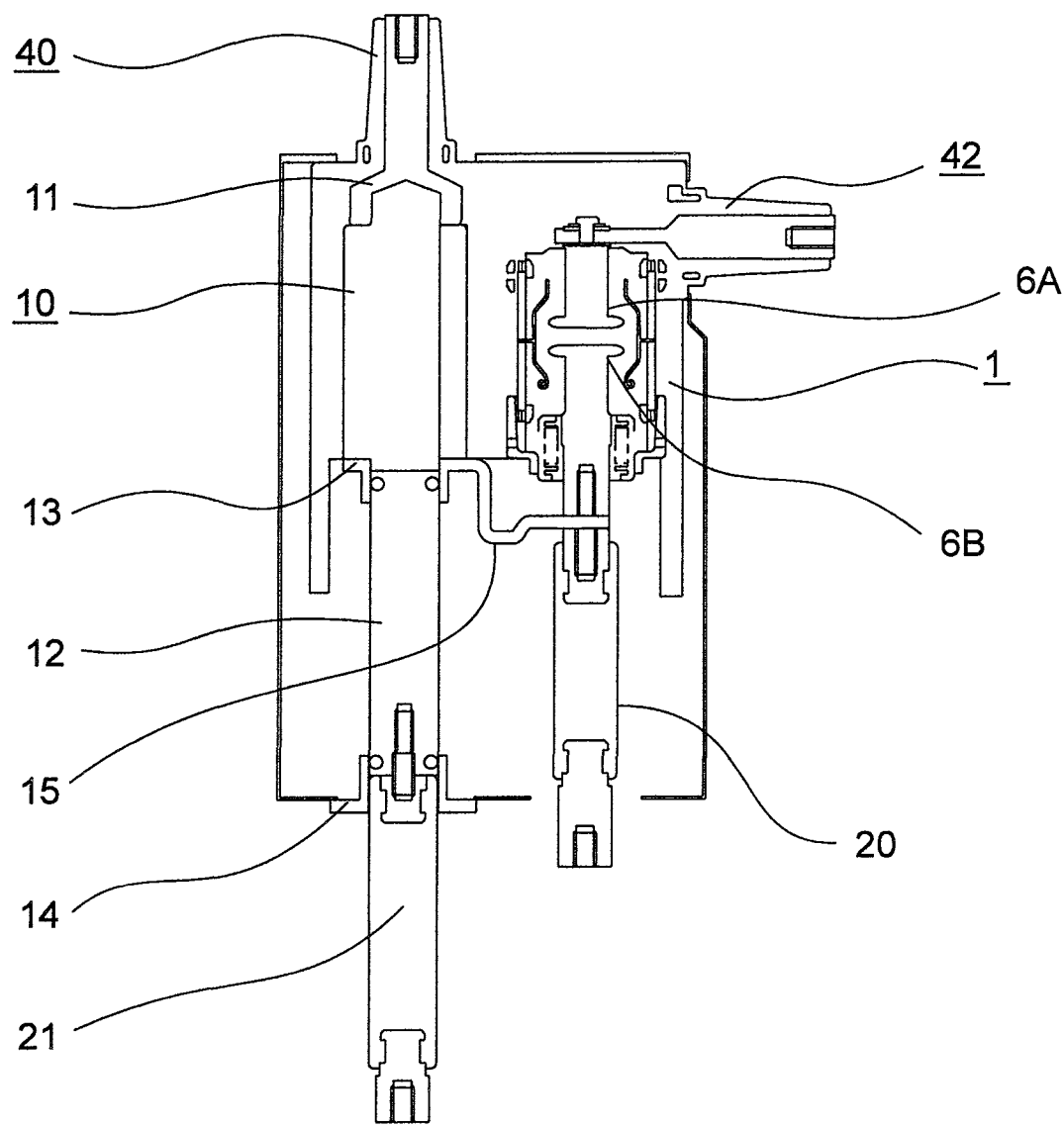
FIG. 5 is a sectional front view for explaining an operation in a pre-earthing mode of the switchgear of the present invention shown in FIG. 1.

FIG. 5 shows a pre-earthing mode. As shown in the drawing, the movable electrodes 12 of the earthing and disconnecting switch, the flexible conductor 15 and the movable side electrode 6B become at ground potential, and a potential difference from the load side occurs between the electrodes in the vacuum valve 1, when the movable electrode 12 of the earthing and disconnecting switch is driven to the lower side of the drawing to the position where the movable electrode 12 of the earthing and disconnecting switch and the earthing side fixed electrode 14 are in contact with each other.

Figure 6:
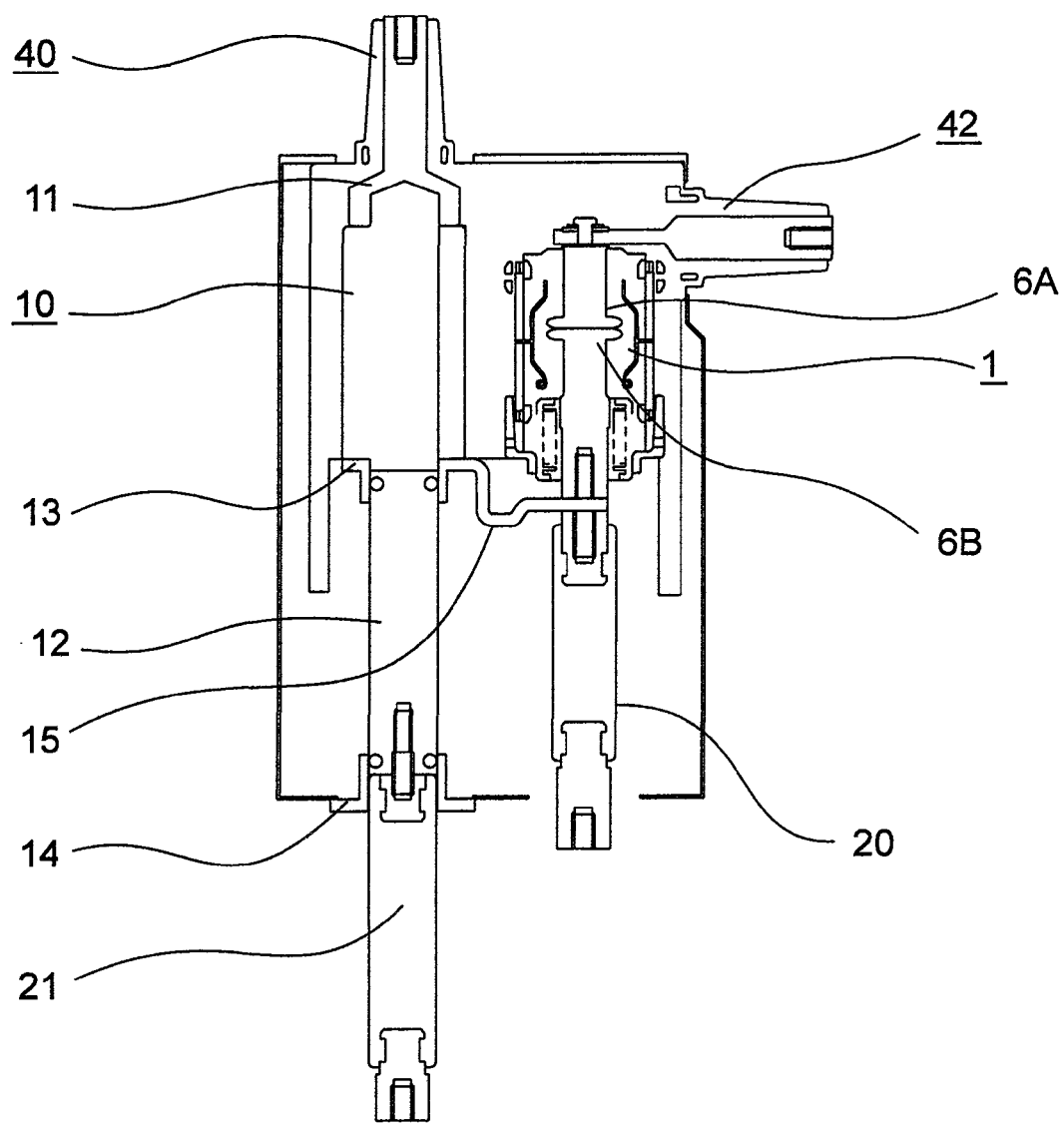
FIG. 6 is a sectional front view for explaining an operation of an earthing mode of the switchgear of the present invention shown in FIG. 1.

FIG. 6 shows an earthing mode. By further closing the vacuum valve 1 from the mode shown in FIG. 5, the cable bushing 42 is earthed via the vacuum valve 1, the flexible conductor 15, the intermediate fixed electrode 13, the movable electrode 12 of the earthing and disconnecting switch and the earthing side fixed electrode 14. At this time, even if the cable bushing 42 is in the conductive state, the final closing operation is performed in the vacuum valve 1. Therefore, short-circuit current closing capacity is not required for the earthing and disconnecting switch 10.

In order to return the mode to the closing mode again from the earthing mode, the vacuum valve 1 is switched to the breaking mode firstly. Thereafter, the movable electrode 12 of the earthing and disconnecting switch is moved so that the spring contact point 16 is in contact with the bushing side fixed electrode 11. Thereafter, the movable side electrode 6B is closed in the vacuum valve 1.

As above, in the present embodiment, insulation is configured with the optimum mixture of insulation in which air, vacuum and solid insulation are optimally combined, and CFC (chlorofluorocarbon) gas is not used at all. Therefore, reduction in size can be achieved while environmental load is reduced. Further, a sealing member is not required, since solid insulation and insulation by atmosphere are adopted inside the metal container. Therefore, the number of components can be reduced, and the configuration is simplified. Further, since the earthing and disconnecting switch 10 is used in which the respective fixed electrodes are linearly disposed and linearly operated, the switchgear is practical in that the installation area is prevented from being large, though the switchgear becomes a little longer in the height direction. In installing the switchgear, there is a relative allowance in the height direction. In addition, since the earthing and disconnecting switch 10 does not have the closing function, and the vacuum valve 1 are designed to have the short-circuit current closing capacity, the device is prevented from becoming large in size even though the earthing and disconnecting switch 10 is used. Further, since the earthing and disconnecting switch 10 is configured to be slidable by using the spring contact points, it can be switched to the closing, disconnect and earthing mode by a linear operation.

In the present embodiment, the earthing and disconnecting switch 10 is configured by being separated from the vacuum valve 1. Therefore, even if a vacuum leak occurs for some reason, the disconnecting mode can be maintained by the earthing and disconnecting switch 10, and reliability can be enhanced. Further, the earthing and disconnecting switch is insulated by air, and therefore, the switchgear can be low-cost as compared with the case of adopting vacuum insulation. Further, breaking of a current is not performed in the air, but is all performed in the vacuum valve 1. Thus, the earthing and disconnecting switch 10 in the air does not have to be equipped with a break performance, and reduction in size of the entire device can be achieved.

Further, in the present embodiment, the periphery of the switch unit casted with the solid insulator 30 is covered with the earthed metal container 31, and thereby, an operator is prevented from receiving an electrical shock. The surface is set at ground potential by being coated with a conductive coating material which is set at ground potential instead of being covered with the earthed metal container 31, as will be described later, and thereby, safety can be ensured.

Further, in the present embodiment, closing and breaking of the voltage and current are performed in the vacuum valve 1 by a pair of contact points. However, a plurality of pairs of contact points such as two pairs of contact points may be adopted.

Further, in the present embodiment, the flexible conductor 15 is used. However, in place of the flexible conductor 15, an ordinary conductor may be used with a slidable structure in which a slidable contactor is disposed in a space between the conductor and the movable side holder 7B.

Further, in the present embodiment, the spring contact points are disposed in the movable electrode 12 of the earthing and disconnecting switch. However, instead of this, the spring contact points may be disposed at the fixed electrode side.

Further, in the present embodiment, three-position switching of closing, disconnecting and earthing is adopted in the earthing and disconnecting switch. However, in some cases, the pre-earthing mode can be combined with the disconnecting mode depending on the installation location of the switchgear. In these cases, two-position switching of closing and earthing may be adopted.

In the present embodiment, the earthing and disconnecting switch 10 is used in combination with the vacuum valve 1. However, the earthing and disconnecting switch 10 itself can be applied to the components other than the vacuum valve 1.

Figure 7:
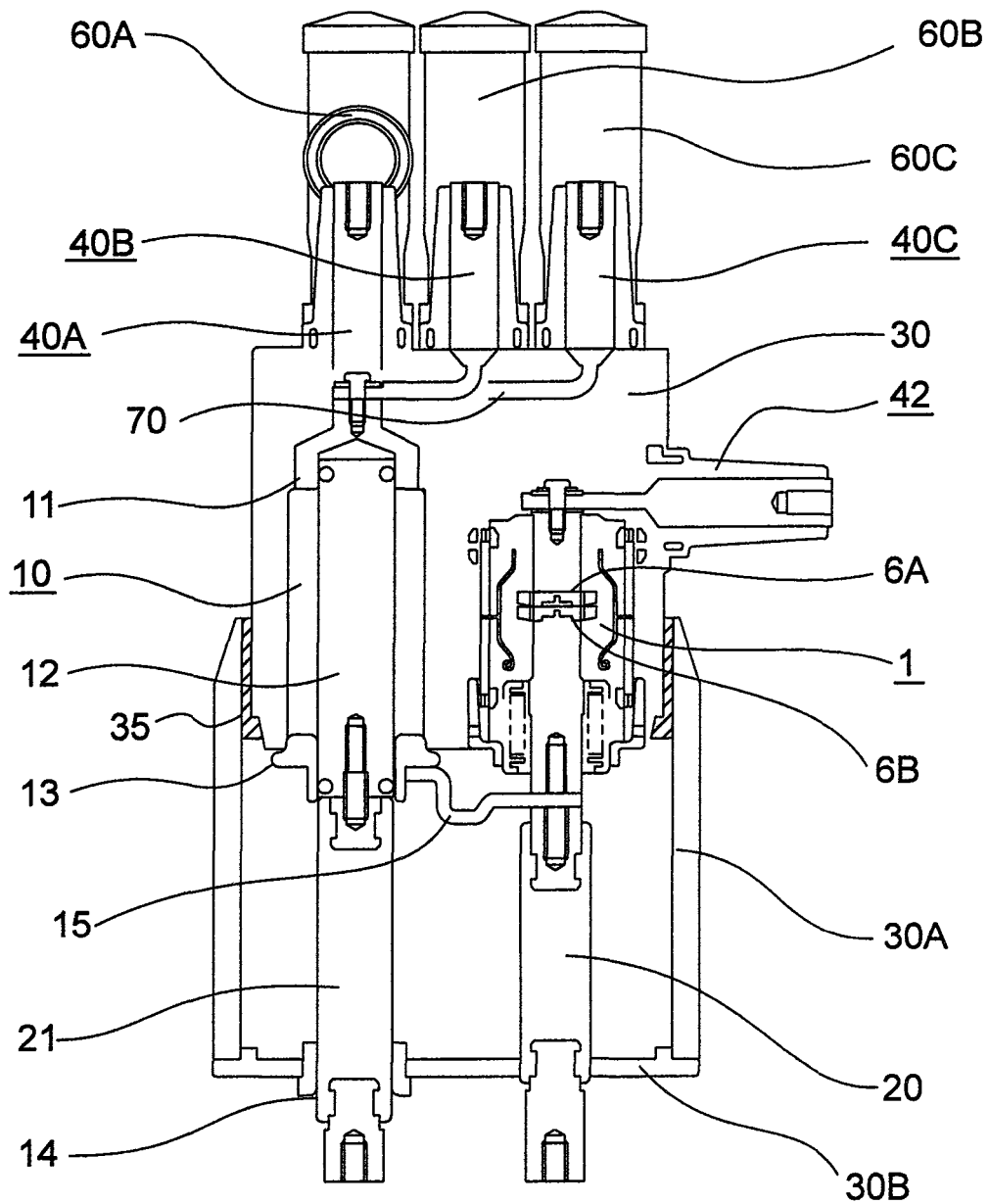
FIG. 7 is a sectional front view for explaining a bus side conductor arrangement of the switchgear of the present invention shown in FIG. 1.
Figure 8:
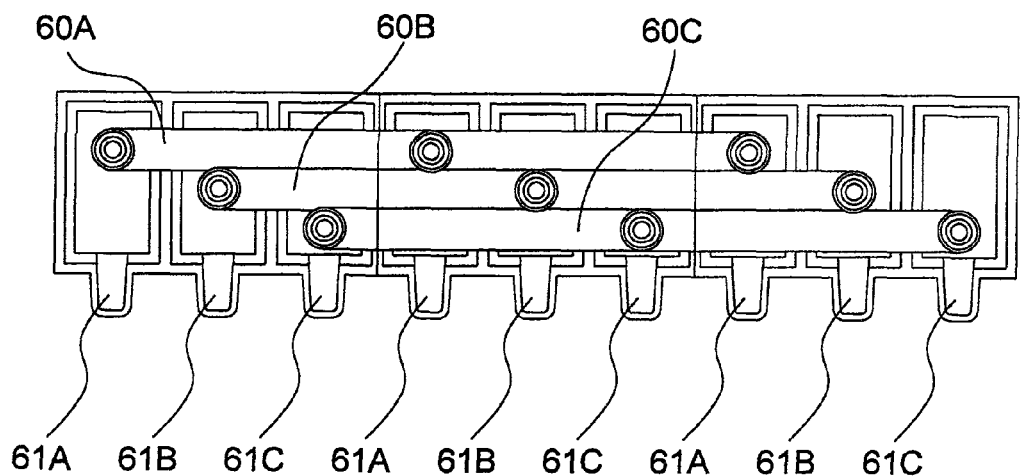
FIG. 8 is a plane view of a three-phase three-circuit switching device configured by the switchgear of the present invention shown in FIG. 1.
Figure 9:
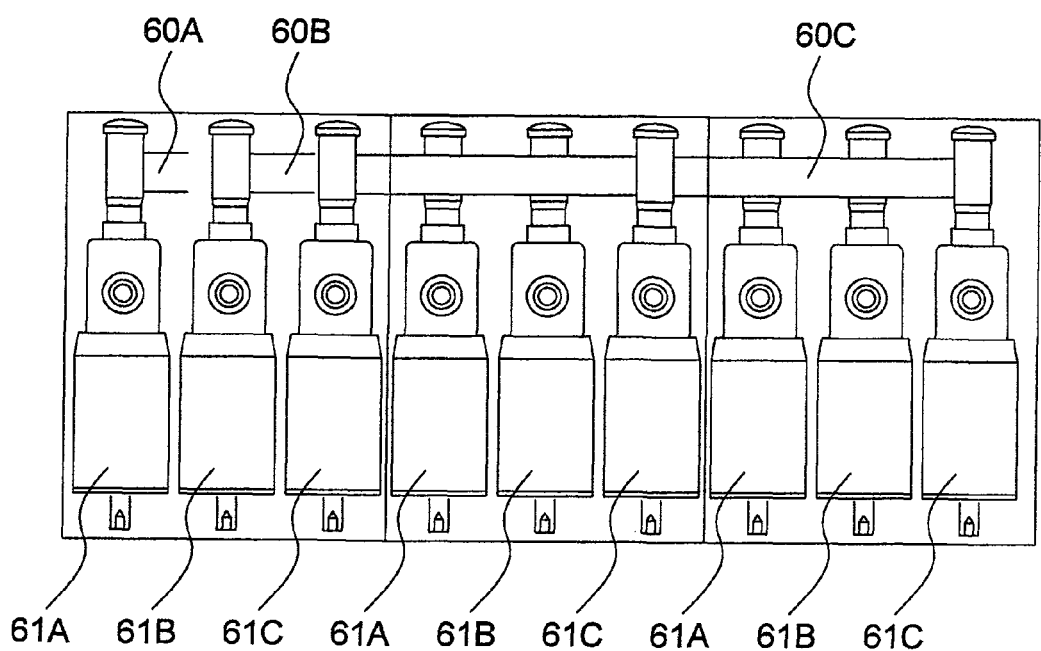
FIG. 9 is a front view of the three-phase three-circuit switching device configured by the switchgear of the present invention shown in FIG. 1.
Figure 10:
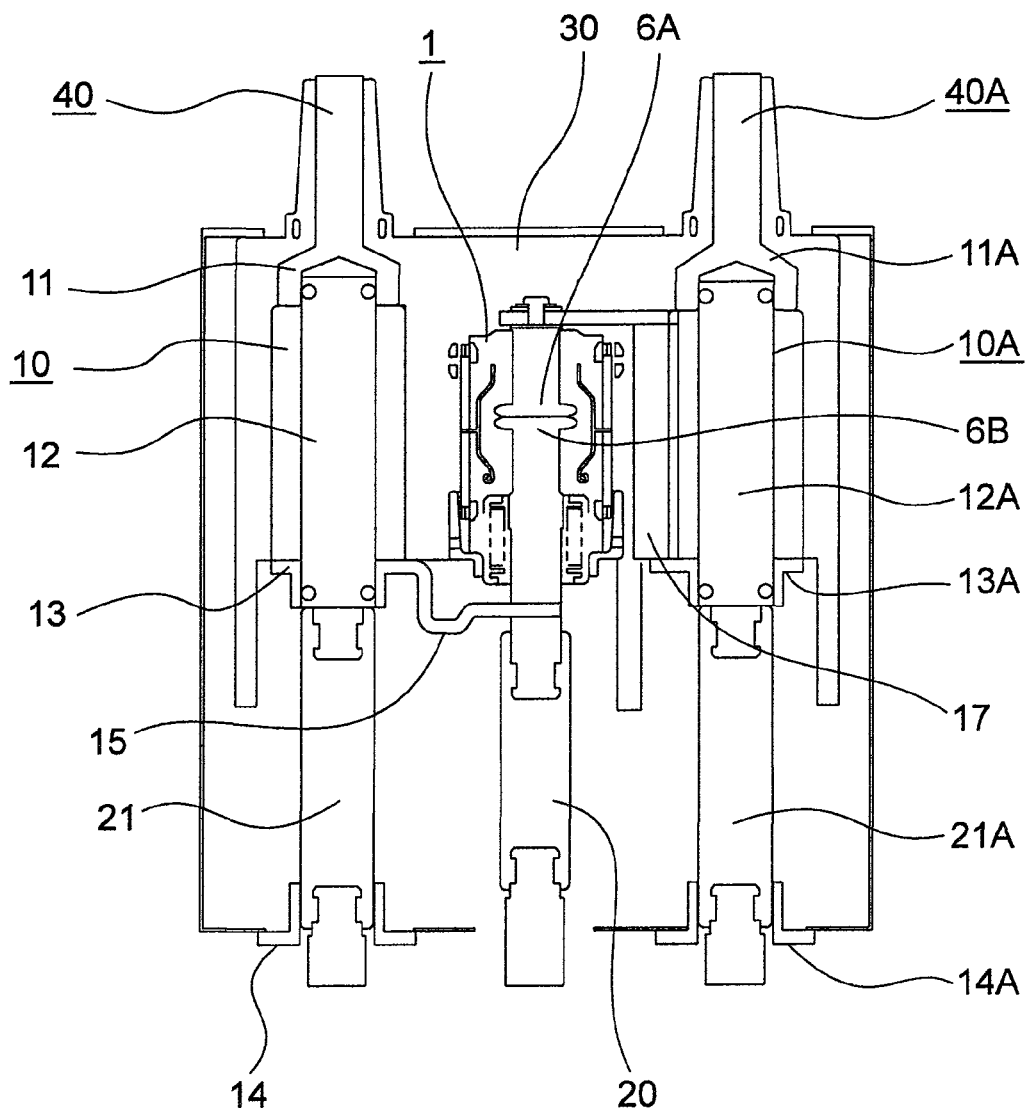
FIG. 10 is a sectional front view of a second embodiment of the switchgear of the present invention.

Next, FIGS. 7 to 9 show an example in which the first embodiment of the switchgear of the present invention is applied to a three-phase three-circuit switch device.

In order to configure a switch unit such that three switch units for AC three phases are adjacently disposed and the units placed side by side are connected with a solid insulating bus, the positions of the bus bushings 40A, 40B and 40C are displaced corresponding to each AC phase as shown in FIG. 7. Thereby, the buses of the respective phases do not overlap one another. The bushing side fixed electrode 11 and the bus bushings are connected by an internal bus 70. In FIG. 7, an insulation sealant 35 is disposed to prevent air with high humidity and fouling substances which are likely to reduce insulating characteristics of the unit from coming into.

As shown in FIG. 7, when a solid insulator 30B has a structure separated from the solid insulator 30 and is combined after casting the solid insulator 30, casting workability of the solid insulator 30 is enhanced.

FIG. 8 shows an example of configuring a three-phase three-circuit switch device in which switch units 61A, 61B and 61C, same as the switch unit shown in FIG. 7, are connected with each other in the same phase by solid insulating buses 60A, 60B and 60C.

Further, FIG. 9 shows a front view of the three-phase three-circuit switch device shown in FIG. 8. The three-phase three-circuit switch device is configured by combining compact light-weight switch units of similar structures. Therefore, excellent assembly workability is achieved.

Figure 11:
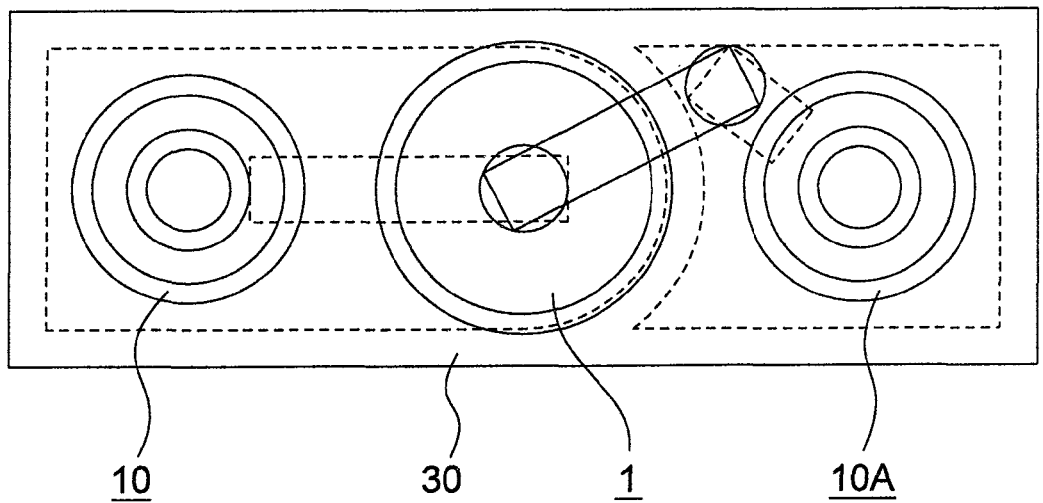
FIG. 11 is a plane view of the second embodiment of the switchgear of the present invention.

A second embodiment of the switchgear of the present invention will be described with reference to FIGS. 10 to 15. In the present embodiment, two earthing and disconnecting switches 10 and 10A, and the vacuum valve 1 are used in combination to configure a bus section board. Specifically, a second earthing and disconnecting switch 10A is provided at the opposite side from the earthing and disconnecting switch 10 with respect to the vacuum valve 1 of the first embodiment shown in FIG. 1. A connection conductor 17 is provided which electrically connects the fixed side electrode 6A of the vacuum valve 1 with an intermediate fixed electrode 13A of the second earthing and disconnecting unit 10A. The first earthing and disconnecting switch 10 and the second earthing and disconnecting switch 10A can be individually operated, so that they can be independently switched to three positions of closing, disconnect and earthing. Further, FIG. 11 is a plane view of the structure shown in FIG. 10. The first earthing and disconnecting switch 10, the vacuum valve 1, and the second earthing and disconnecting switch 10A are collectively molded with the solid insulator 30. As shown in FIG. 11, the vacuum valve 1 and the second earthing and disconnecting switch 10A are connected with the conductor bended in the space in the switch unit. Thereby, the switch unit is prevented from being large in size, though the connection conductor 17 to be at a high voltage is sufficiently separated from the part in the air near the electrode 14A.

An operation of the second embodiment of the switchgear of the present invention as is configured above will be described with reference to FIGS. 12 to 15.

Figure 12:
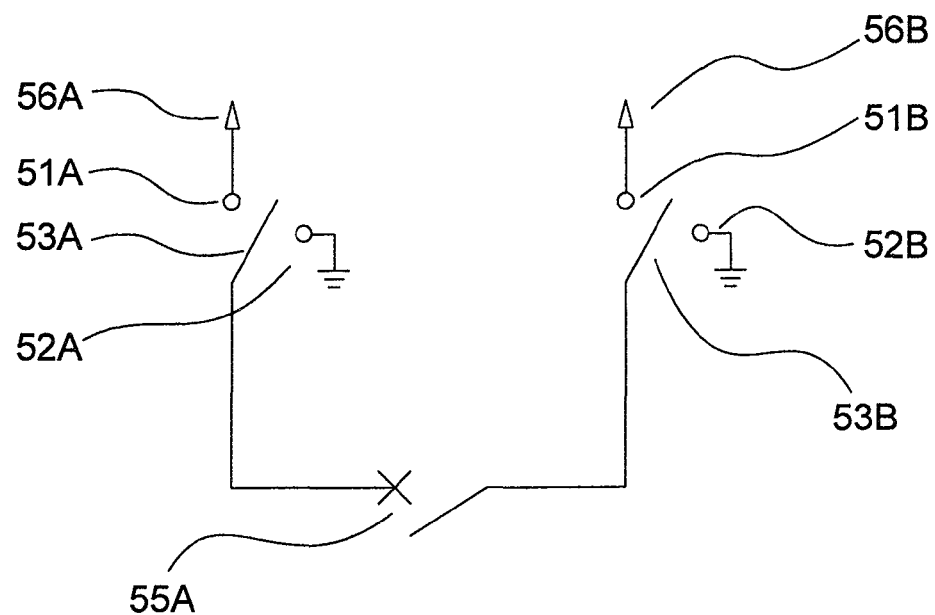
FIG. 12 is a single-line diagram for explaining an operation of the second embodiment of the switchgear of the present invention.

In FIG. 12, the first bushing side fixed electrode 11 corresponds to an earthing and disconnecting switch fixed contacts 51A. The first movable electrode 12 of the earthing and disconnecting switch corresponds to an earthing and disconnecting switch movable contact 53A. The first earthing side fixed electrode 14 corresponds to an earthing and disconnecting switch earthing contact 52A. The fixed side electrode 6A of the vacuum valve 1 corresponds to a current switch section fixed contact point 54A. A cable head 56A is connected to the cable bushing 42. Further, a second bushing side fixed electrode 11A corresponds to an earthing and disconnecting switch fixed contact 51B. A second movable electrode 12A of the earthing and disconnecting switch corresponds to an earthing and disconnecting switch movable contact 53B. A second earthing side fixed electrode 14A corresponds to an earthing and disconnecting switch contact 52B. As shown in the drawing, the first earthing and disconnecting switch 10 and the second earthing and disconnecting switch 10A can be switched to earthing and disconnecting positions individually.

Figure 13:
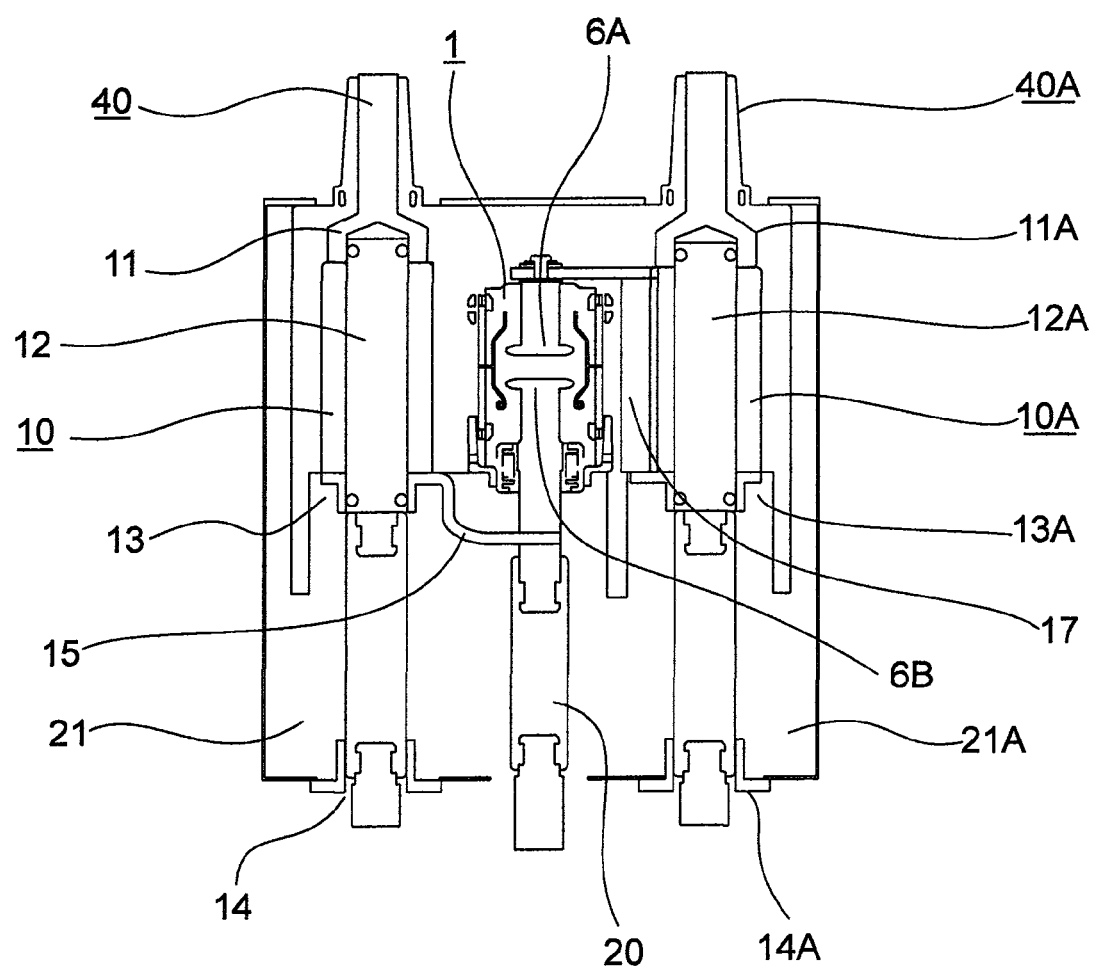
FIG. 13 is a front sectional view for explaining an operation in a breaking mode of the switchgear of the present invention shown in FIG. 10.

FIG. 13 shows a breaking mode. In the closing mode shown in FIG. 10, load current flows from the bus bushing 40 to the bus bushing 40A via the earthing and disconnecting switch 10, the vacuum valve 1 and the earthing and disconnecting switch 10A. When a short-circuit occurs in this mode at the bus side which is connected to the bus bushing 40, and then a large fault current flows, the fault current is broken by breaking the vacuum valve 1 as shown in FIG. 13.

Figure 14:
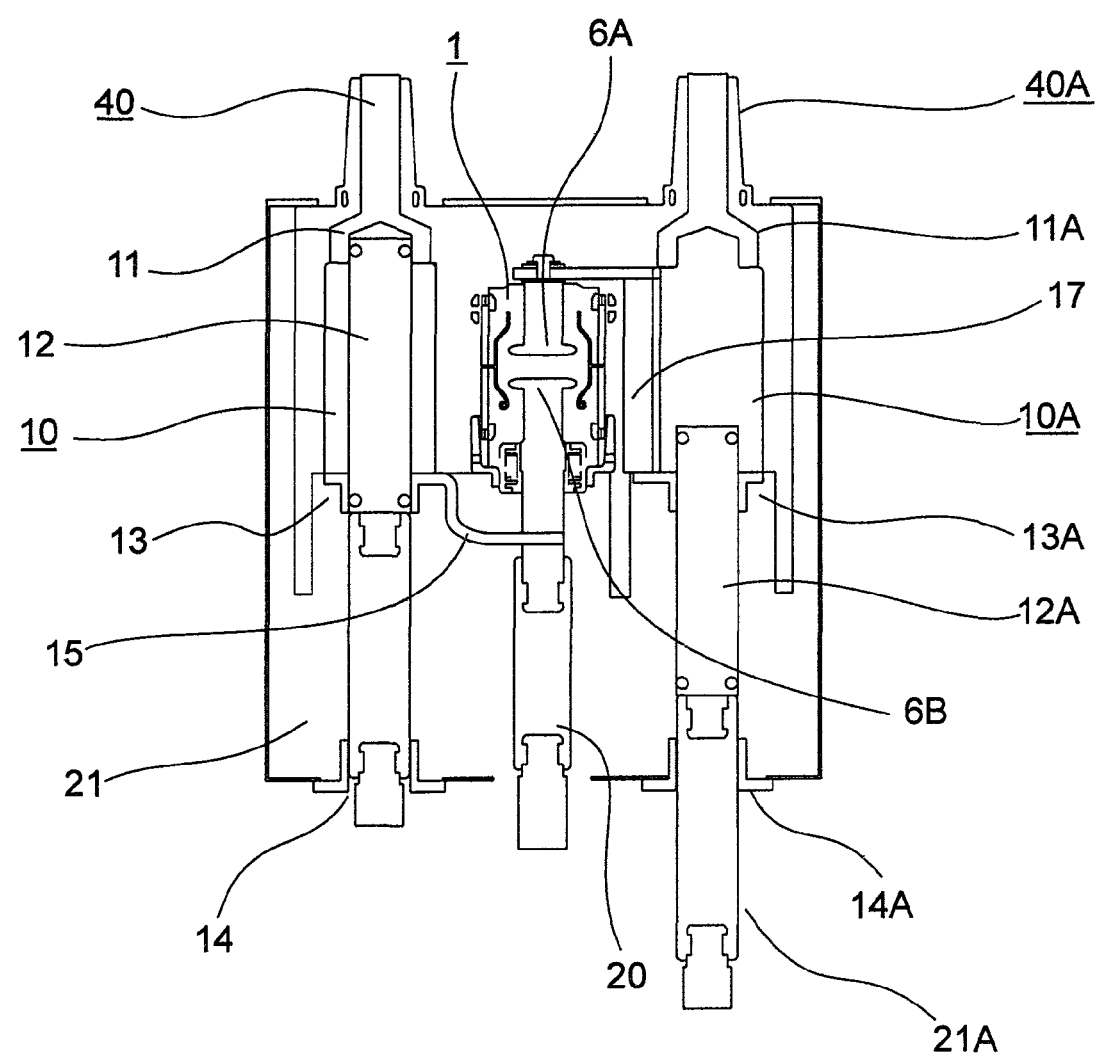
FIG. 14 is a sectional front view for explaining an operation in a disconnecting mode of the switchgear of the present invention shown in FIG. 10.

FIG. 14 shows a disconnecting mode. The disconnecting mode is produced by driving the second movable electrode 12A of the earthing and disconnecting switch to the lower side of the drawing to the position where the second movable electrode 12A of the earthing and disconnecting switch, and the second bushing side fixed electrode 11A and the second earthing side fixed electrode 14A are not electrically continued to one another, and a gap of the second movable electrode 12A of the earthing and disconnecting switch and the second bushing side fixed electrode 11A is large, and a gap of the second movable electrode 12A of the earthing and disconnecting switch and the second earthing side fixed electrode 14A is small.

At this mode, the bus bushing 40 and the second bus bushing 40A are disconnected at the two points of the vacuum valve 1 and the earthing and disconnecting switch 10A. Therefore, high reliability is obtained. Further, designing the withstand voltage between the second movable electrode 12A of the earthing and disconnecting switch and the second earthing side fixed electrode 14A to be lower than the withstand voltage between the fixed side electrode 6A and the movable side electrode 6B of the vacuum valve 1, a highly reliable structure with ground preference can be provided.

Figure 15:
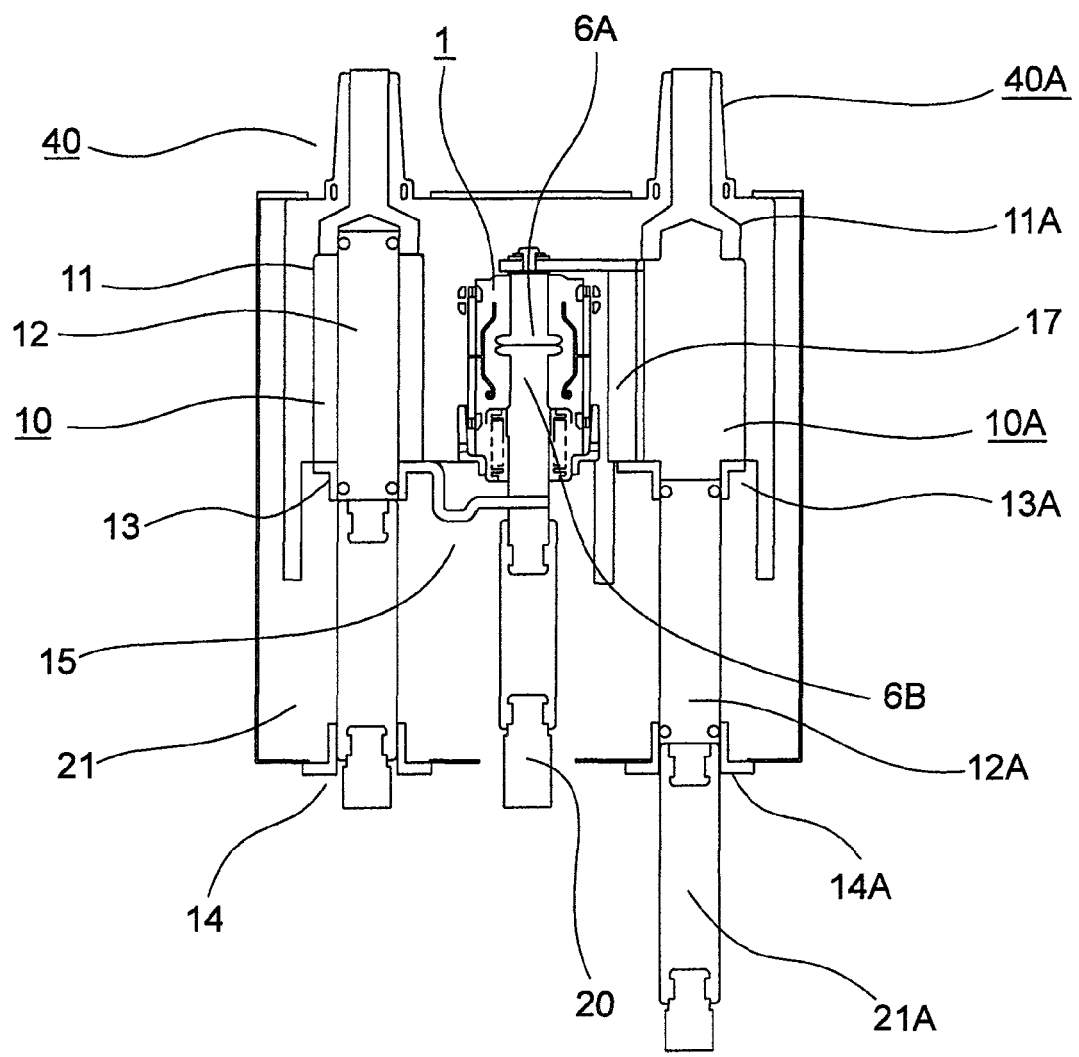
FIG. 15 is a sectional front view for explaining an operation of an earthing mode of the switchgear of the present invention shown in FIG. 10.

FIG. 15 shows an earthing mode. First, the second movable electrode 12A of the earthing and disconnecting switch is driven to the lower side of the drawing to the position where the second movable electrode 12A of the earthing and disconnecting switch and the second earthing side fixed electrode 14A are in contact with each other. Next, by closing the vacuum valve 1, the first bus bushing 40 is earthed via the earthing and disconnecting switch 10, the vacuum valve 1, the connection conductor 17, the second intermediate fixed electrode 13A, the movable electrode 12A of the earthing and disconnecting switch and the earthing side fixed electrode 14A. At this time, even if the bus bushing 40 is in the conductive state, the final closing operation is performed in the vacuum valve 1. Therefore, short-circuit current closing capacity is not required for the second earthing and disconnecting switch 10A.

When the second bus bushing is to be earthed, the similar process can be performed by exchanging the first earthing and disconnecting switch for the second earthing and disconnecting switch. More specifically, firstly, the mode is shifted from the closing mode shown in FIG. 10 to the breaking mode shown in FIG. 13. Thereafter, the first movable electrode 12 of the earthing and disconnecting switch is driven to the lower side of the drawing to be contact with the earthing side fixed electrode 14. Thereafter, the vacuum valve 1 is closed, and thereby, the bus bushing 40 is earthed via the earthing and disconnecting switch 10A, the vacuum valve 1, the flexible conductor 15, the first intermediate fixed electrode 13, the movable electrode 12 of the earthing and disconnecting switch and the earthing side fixed electrode 14.

Figure 16:
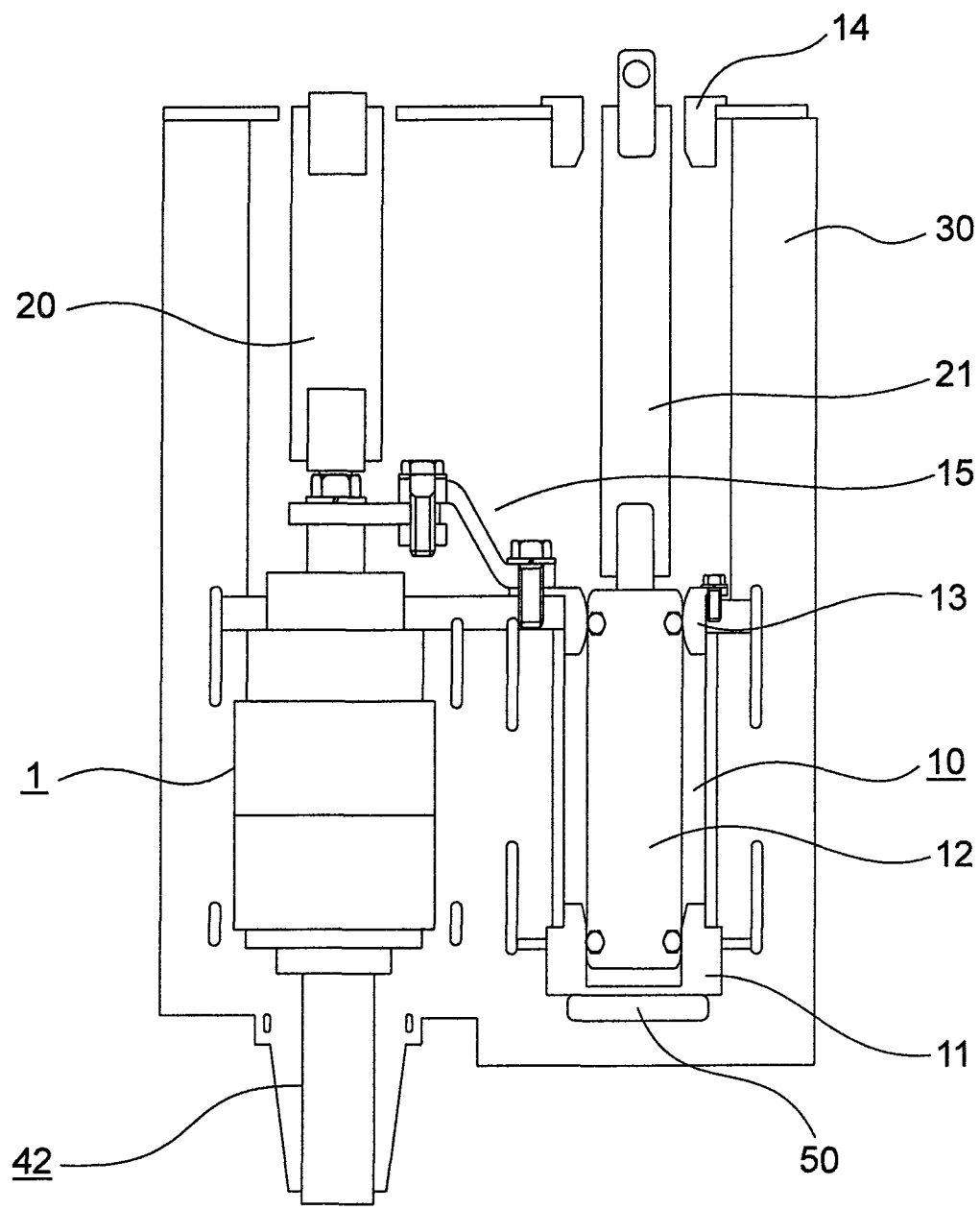
FIG. 16 is a sectional side view of a third embodiment of the switchgear of the present invention.
Figure 17:
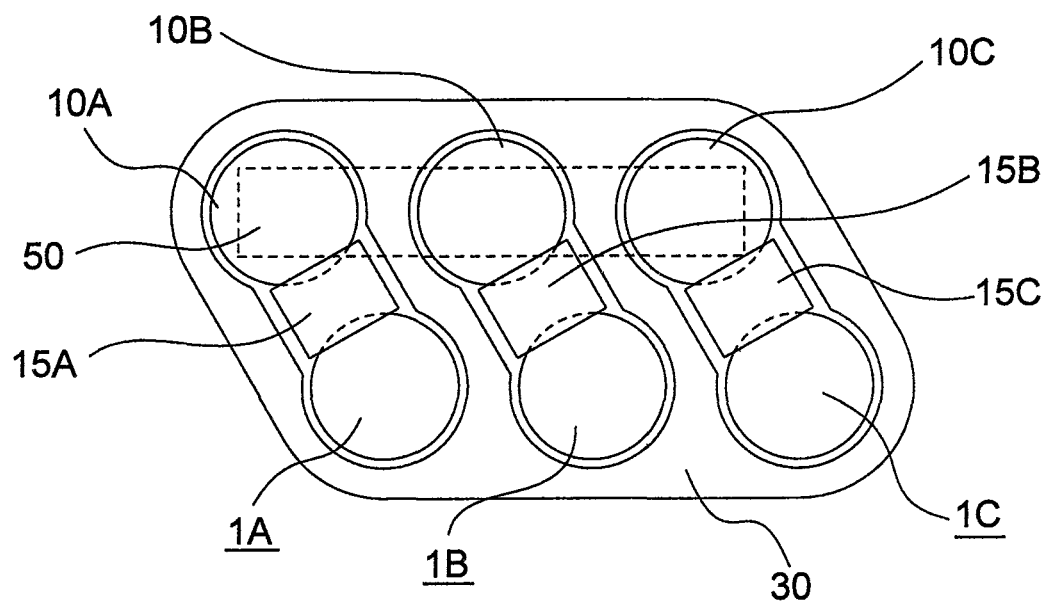
FIG. 17 is a plane view of the third embodiment of the switchgear of the present invention.
Figure 18:
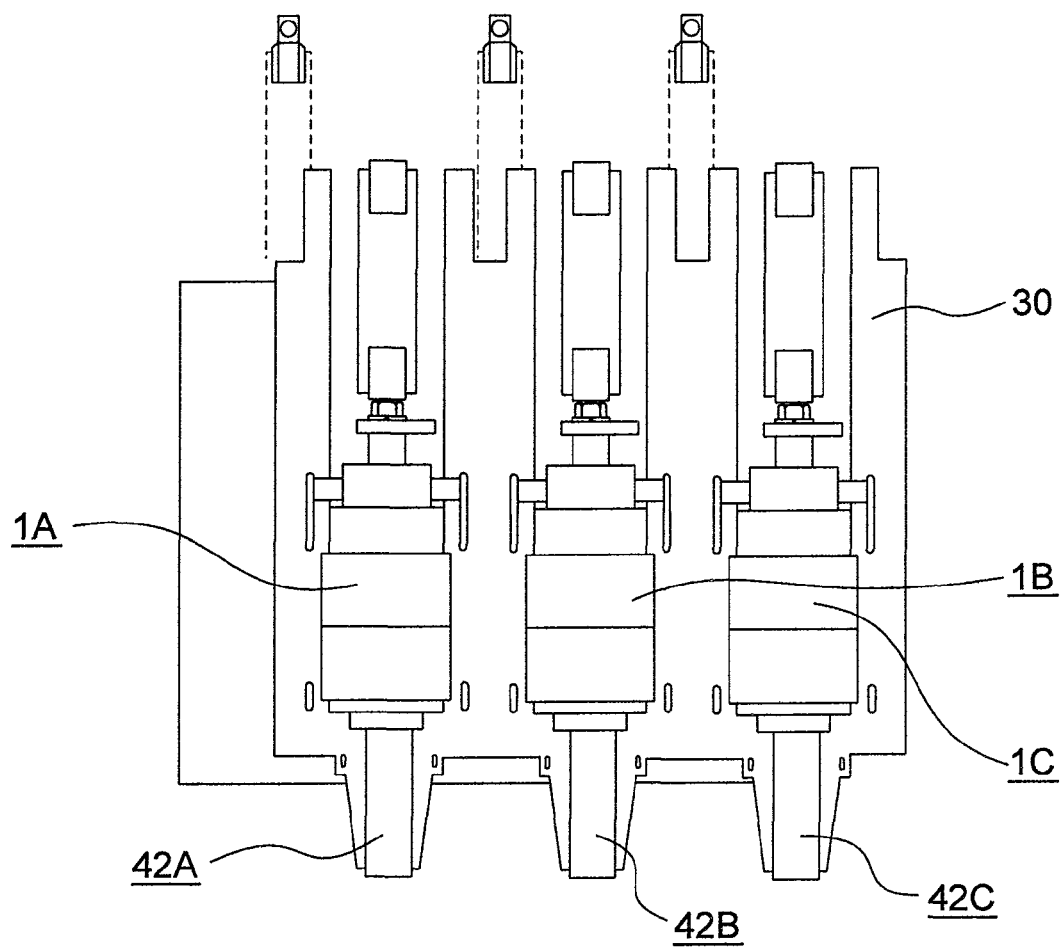
FIG. 18 is a front view of the third embodiment of the switchgear of the present invention.

Next, FIGS. 16 to 18 show a third embodiment of the switchgear of the present invention. In the present embodiment, as shown in FIG. 16, a common bus conductor 50 is provided as a high-voltage conductor in place of the bus bushing of the switchgear according to the first embodiment of the present invention. The common bus conductor 50 electrically connects the bushing side fixed electrodes 11 of the earthing and disconnecting switches 10. A plurality of these units are collectively casted with a solid insulator. Since the common bus conductor 50 is used, the bus bushing is not required. Also, the amount of molding material can be reduced as a whole. In addition, a bus is not required. Therefore, reduction in size of the switchgear can be achieved as a whole, and the number of components is further decreased, which leads to cost reduction.

FIGS. 17 and 18 show an example of configuring the switch device for one phase out of a three-phase AC three-circuit switch device unit using the third embodiment. The earthing and disconnecting switches 10A, 10B and 10C, vacuum valves 1A, 1B and 1C, flexible conductors 15A, 15B and 15C and the like are collectively casted with the solid insulator 30, and cable bushings 42A, 42B and 42C are also casted at the same time. Collective casing leads to reducing the amount of the mold material as a whole, and then reducing the cost.

Further, in the present embodiment, the switch unit of the same phase can be integrally molded, and therefore, the number of castings can be reduced.

Figure 19:
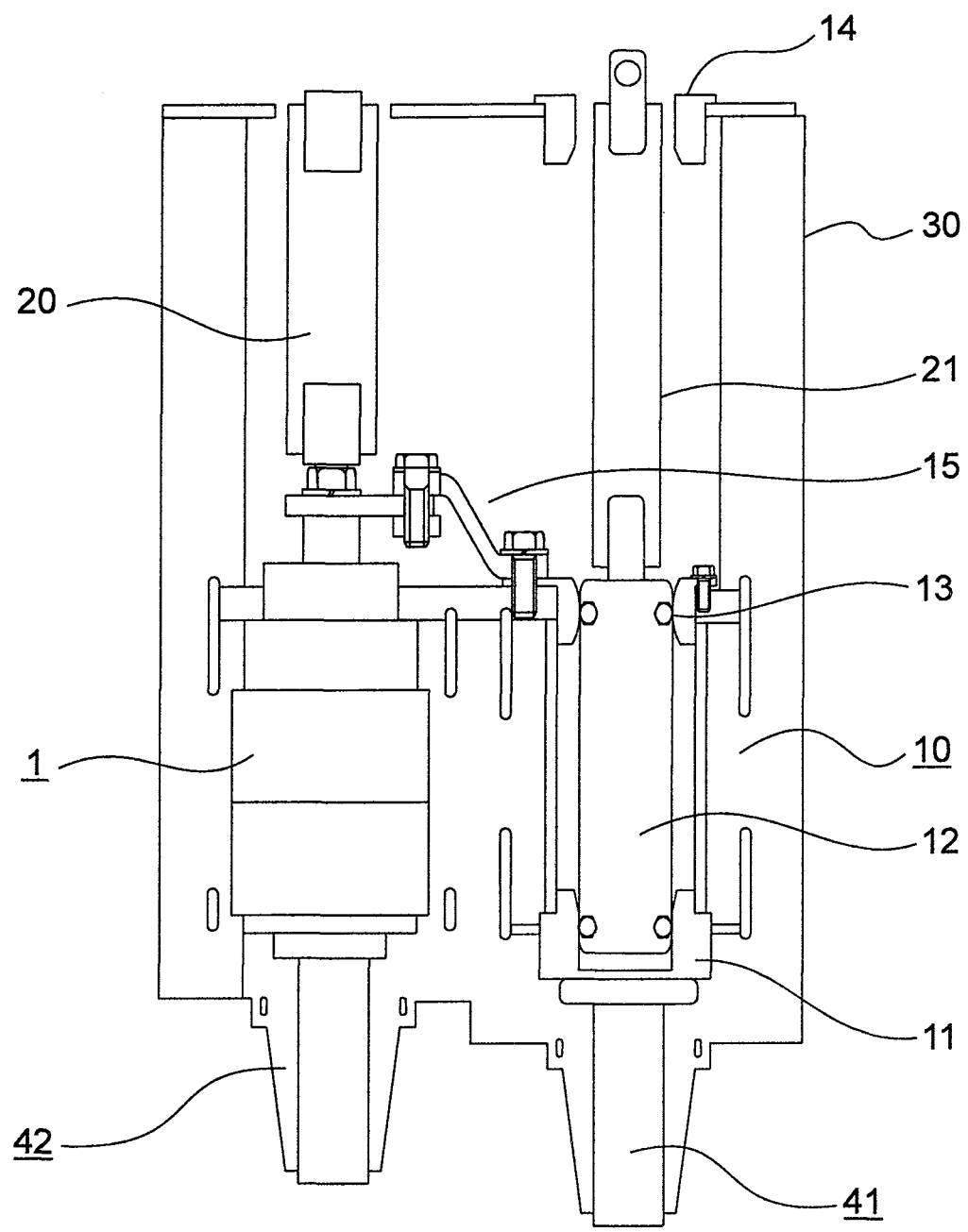
FIG. 19 is a sectional front view of a fourth embodiment of the switchgear of the present invention.
Figure 20:
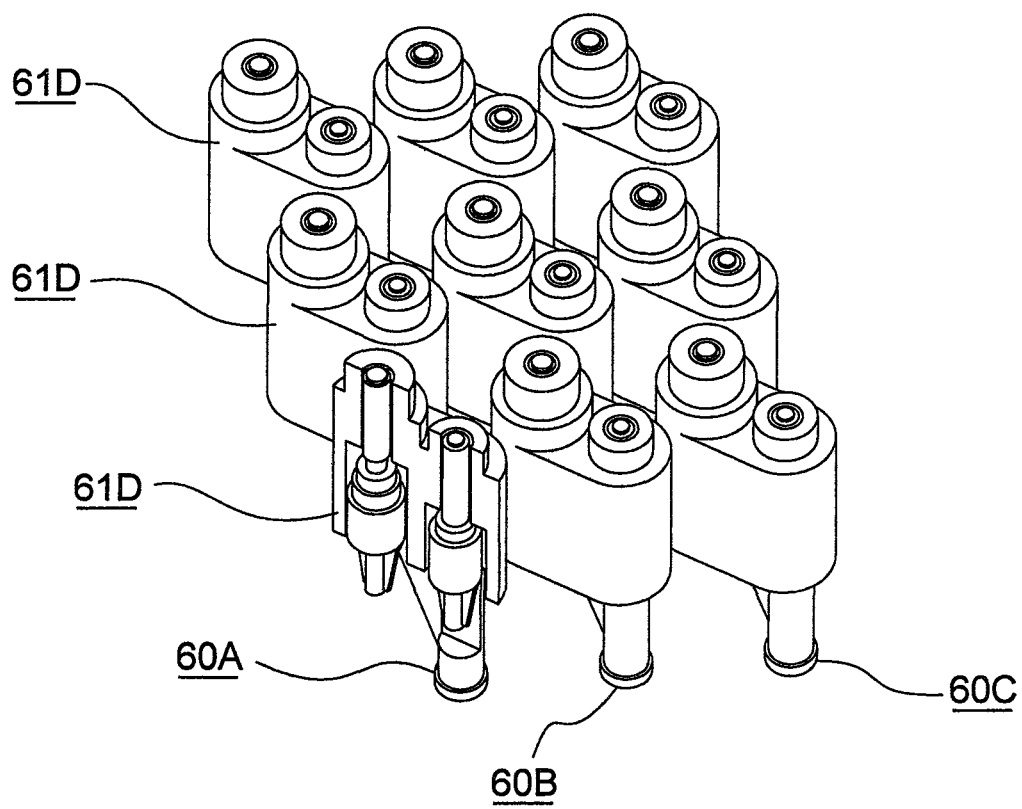
FIG. 20 is a perspective view of a three-phase three-circuit switching device configured by the switchgear of the present invention shown in FIG. 19.

FIGS. 19 and 20 show a fourth embodiment of the switchgear of the present invention. In the present embodiment, the bus bushing 40 and the cable bushing 42 are projected in the same direction. In FIG. 20, the switch unit shown in FIG. 19 is used as one switch unit 61D. The three-circuit switch unit assemblies are disposed for three phases parallel with the lateral direction (within the same plane) of the drawing. The bus bushings 40 of the switch units are connected with each other by solid insulating buses 60A, 60B and 60C. As compared with a linear arrangement, such arrangement leads to space saving as a whole, and the length of the bus to be used becomes short. Therefore, the cost is reduced. Further, the switchgear is molded by the switch unit assemblies, and thereby the amount of molding material per switchgear can be reduced more than the case of integrally molding a plurality of switch units, which results in reduction in weight and cost. Further, in the present embodiment, a not-illustrated operation mechanism can be placed for each circuit in the lateral direction of the drawing. Therefore, waste space does not exist. And, by operating three phases at one time over the entire switch unit assembly, the installation area of the switch can be significantly reduced.

Figure 21:
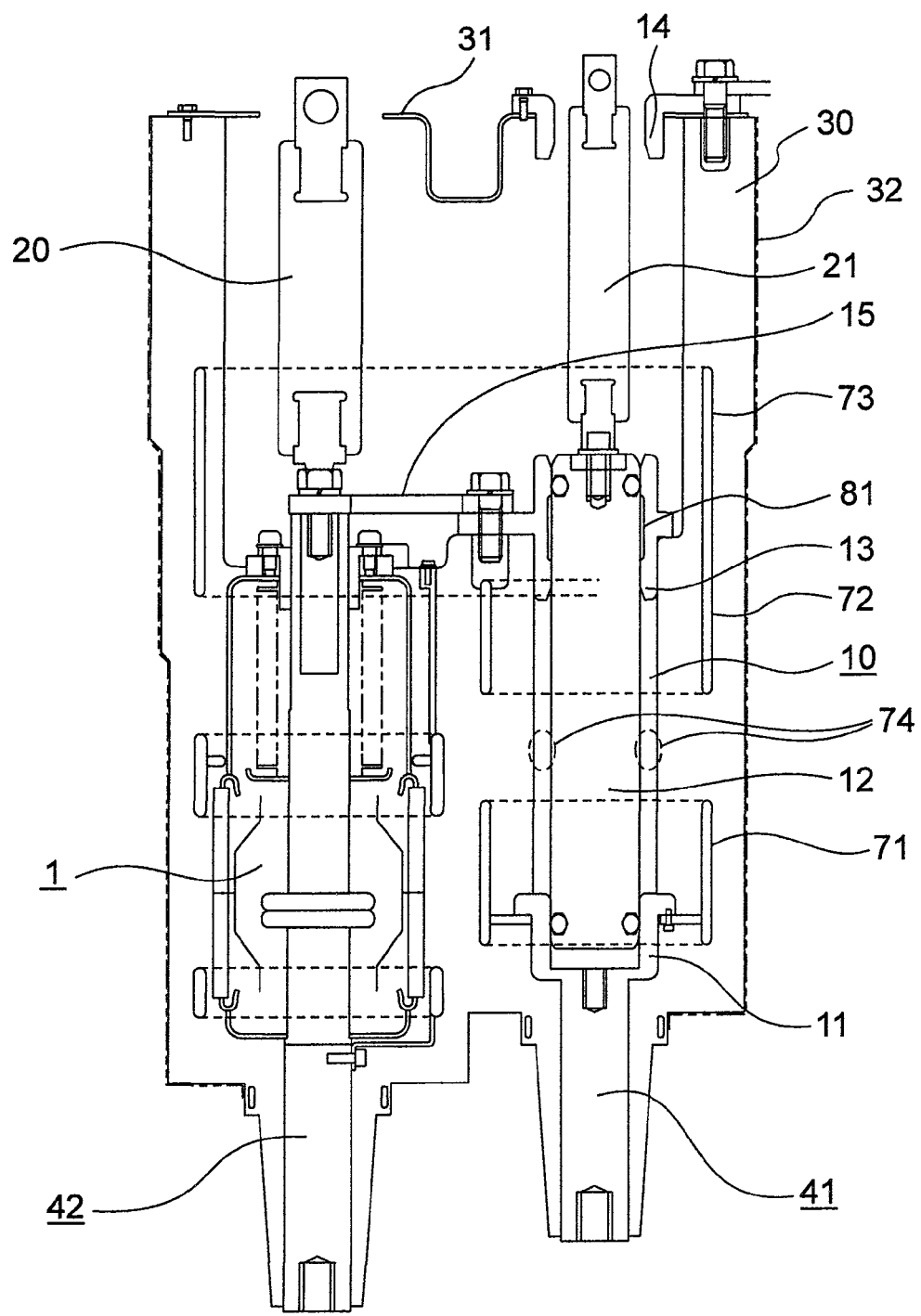
FIG. 21 is a sectional front view of a fifth embodiment of the switchgear of the present invention in a closing mode.
Figure 22:
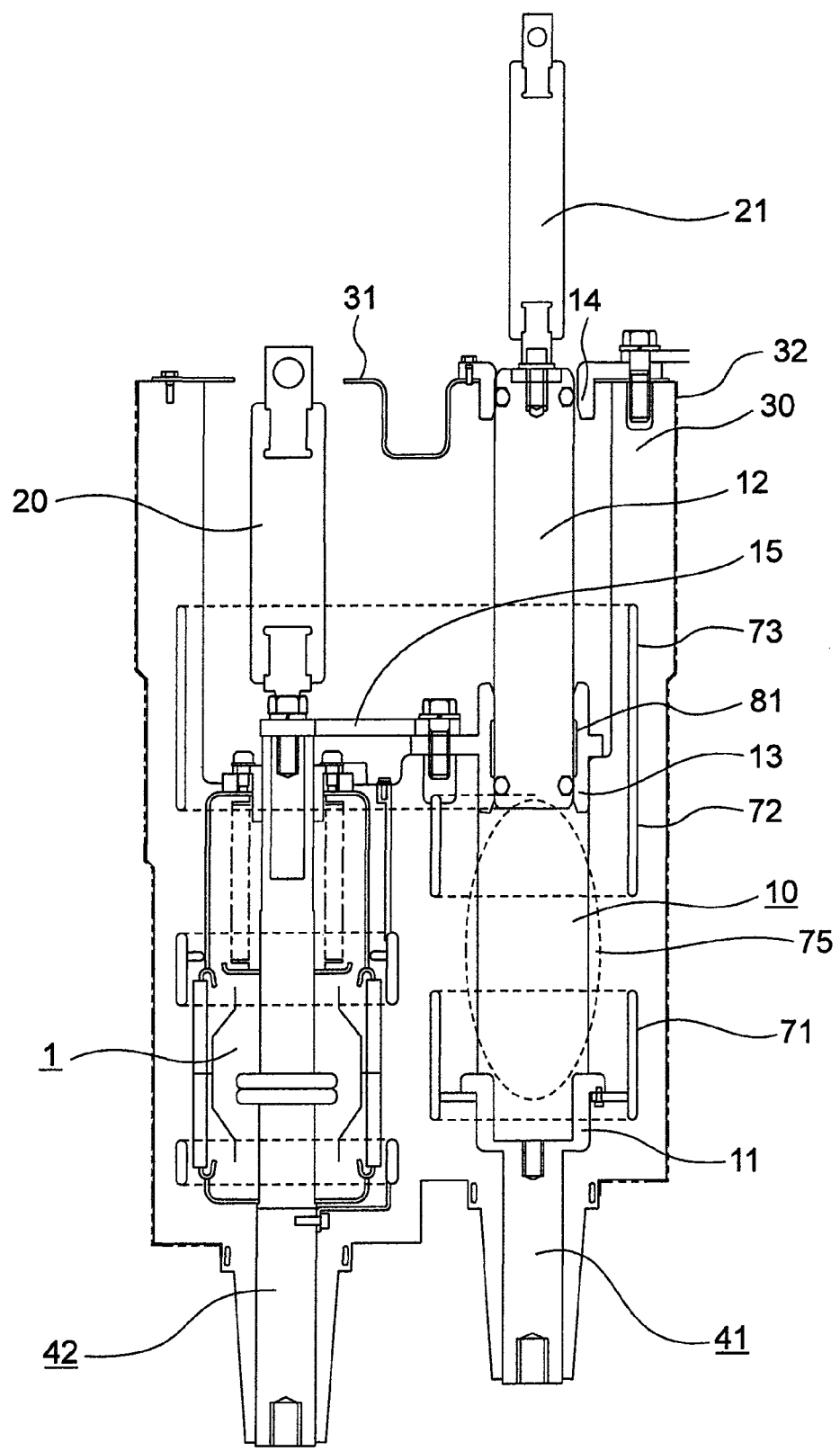
FIG. 22 is a sectional front view of the fifth embodiment of the switchgear of the present invention in an earthing mode.

FIGS. 21 and 22 show a fifth embodiment of the switchgear of the present invention. FIG. 21 shows the earthing and disconnecting switch 10 in the closing mode, and FIG. 22 shows in the earthing mode. In FIGS. 21 and 22, a conductive coating 32 is applied to the outer surface of the solid insulator 30 in place of the metal container 31. Further, in order to reduce the weight of the solid insulator 30 as much as possible, a bus side shield 71, a vacuum valve side shield 72 and an operation rod side shield 73 are buried in the solid insulator 30 in the earthing and disconnecting switch 10, and are disposed coaxially with the earthing and disconnecting switch 10. In FIG. 21, the bus side shield 71 and the vacuum valve side shield 72 reduce the thickness of the solid insulator with ensuring the insulating performance, since a high electric field section 74 in the air during closing mode is formed in the vicinity of the center portion filled with air between the electrodes and reduces the electric field of this portion, when the movable electrode 12 of the earthing and disconnecting switch is in a closing mode. Further, in FIG. 22, a large voltage is applied between the intermediate fixed electrode 13 at ground potential and the bushing side fixed electrode 11 which is connected to the bus side, and an electric field is concentrated in the air in the vicinity of the tip end portion of both the fixed electrodes. Thus, the bus side shield 71 and the vacuum valve side shield 72 are disposed to surround the intermediate fixed electrode 13 and the bushing side fixed electrode 11 to which an electric field are concentrated. Thereby, the concentration of the electric field is relieved, and an insulating performance is secured. Further, in FIG. 21, the operation rod side of the electric field of the flexible conductor 15 and the intermediate fixed electrode 13 is reduced by the operation rod side shield 73, and the insulating performance around the operation rod is ensured. The above configuration also can be commonly applied to the aforementioned respective embodiments. Since these shields are disposed and buried as such, the insulating performance can be kept even though the thickness of the mold member is reduced. The reduction in size of the device, especially in the diameter direction, can be achieved.

FIGS. 21 and 22 show one example of a guide 81 which is disposed so that the position does not deviates in the diameter direction of the movable electrode 12 of the earthing and disconnecting switch. The positional precision of the movable electrode 12 of the earthing and disconnecting switch is enhanced by disposing the guide 81 inside the earthing and disconnecting switch intermediate fixed electrode.

In the above described respective embodiments, some configurations inverted in the vertical direction are shown. However, vertically inverted configuration can be adopted in any of embodiments.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A switchgear, comprising:
   a vacuum valve, which has a fixed electrode and a movable electrode, and inside of which a vacuum is produced,
   an air-insulated earthing-and-disconnecting switch comprising a movable electrode, a bus side fixed electrode disposed at a bus side, an earthing side fixed electrode at ground potential, and an intermediate fixed electrode which is located midway between the bus side fixed electrode and the earthing side fixed electrode, and
   a solid insulator with which the vacuum valve and the air insulated earthing-and disconnecting switch are integrally molded,
   wherein the intermediate fixed electrode is electrically connected to a moveable side holder of the vacuum valve via a flexible conductor,
   wherein the fixed electrodes are linearly disposed, and the movable electrode of the air-insulated earthing-and-disconnecting switch is slidably contactable to the bus side fixed electrode, the intermediate fixed electrode, and the earthing side fixed electrode,
   wherein the earthing side fixed electrode is located on the opposite side of the bus side fixed electrode with respect to the movable electrode of the air-insulated earthing-and-disconnecting switch, and
   wherein the movable electrode of the air-insulated earthing-and-disconnecting switch is linearly displaced to three positions, including a closing position, a disconnecting position, and an earthing position.

2. The switchgear according to claim 1, wherein, in the disconnecting position, a gap between the movable electrode of the earthing-and-disconnecting switch and the bus side fixed electrode is larger than a gap between the movable electrode of the earthing-and-disconnecting switch and the earthing side fixed electrode.

3. The switchgear according to claim 1, wherein, in the disconnecting position, a withstand voltage between the movable electrode of the earthing-and-disconnecting switch and the earthing side fixed electrode is lower than a withstand voltage between the fixed electrode and the movable electrode of the vacuum valve.

4. The switchgear according to claim 1, wherein, in the disconnecting position, the fixed electrode and the movable electrode of the vacuum valve are also opened, and the switchgear is disconnected at two points of the earthing-and-disconnecting switch and the vacuum valve.

5. The switchgear according to claim 2, wherein, in the disconnecting position, the fixed electrode and the movable electrode of the vacuum valve are also opened, and the switchgear is disconnected at two points of the earthing-and-disconnecting switch and the vacuum valve.

6. The switchgear according to claim 3, wherein, in the disconnecting position, the fixed electrode and the movable electrode of the vacuum valve are also opened, and the switchgear is disconnected at two points of the earthing-and-disconnecting switch and the vacuum valve.

7. The switchgear according to claim 1, wherein the bus side fixed electrode, the intermediate fixed electrode, and the earthing side fixed electrode are linearly disposed and formed so that inside diameters thereof are equal to each other, and wherein the movable electrode of the earthing-and-disconnecting switch comprises a spring contact point slidably contacting the bus side fixed electrode, the intermediate fixed electrode, and the earthing side fixed electrode.

8. The switchgear according to claim 1, wherein a surface of the switchgear is earthed.

9. The switchgear according to claim 8, wherein the switchgear is covered with an earthed metal plate.

10. The switchgear according to claim 8, wherein a surface of the solid insulator is coated with a earthed conductive coating material.

11. The switchgear according to claim 1, wherein a guide that guides the movable electrode of the earthing-and-disconnecting switch is provided inside the intermediate fixed electrode.

12. The switchgear according to claim 1, wherein a bus side shield, a vacuum valve side shield, and an operation rod side shield, which are disposed coaxially with the earthing-and-disconnecting switch, are further provided, and wherein the bus side shield, the vacuum valve side shield, and the operation rod side shield are disposed and buried in the solid insulator.

13. The switchgear assembly comprising switchgears according to claim 1 for a plurality of phases, wherein the bus side fixed electrodes of a plurality of the switchgears are connected to bus bushings connected to a bus, and wherein the bus side fixed electrodes and the bus bushings are connected by an internal bus so that the buses of the respective phases do not overlap one another.

14. The switchgear according to claim 1, wherein a second earthing-and-disconnecting switch comprises a movable electrode of the earthing-and-disconnecting switch, a second bus side fixed electrode is disposed at a bus side, a second intermediate fixed electrode is electrically connected to the electrode at the other side of the electrode connected to the intermediate fixed electrode in the vacuum valve, and a second earthing side fixed electrode at ground potential is further provided at the opposite side of the earthing-and-disconnecting switch with respect to the vacuum valve, wherein the second intermediate fixed electrode is electrically connected to the electrode in the vacuum valve via a connection conductor, wherein the second earthing-and-disconnecting switch is also integrally molded with the solid insulator, and wherein the earthing-and-disconnecting switches are independently switchable to three positions, including a closing position, a disconnecting position, and an earthing position.

15. The switchgear assembly comprising a plurality of switchgears according to claim 1 for each phase, wherein a common bus conductor connecting the bus side fixed electrodes of the same phase is further provided, and wherein the plurality of switchgears connected by the common bus conductor are integrally molded with the solid insulator.

16. The switchgear assembly comprising a plurality of switchgears according to claim 1, wherein the bus side fixed electrode is connected to a bus bushing connected to a bus, wherein the fixed electrode of the vacuum valve is connected to a cable bushing connected to a cable, wherein the bus bushing and the cable bushing are projected in the same direction, and wherein three switchgears configuring three circuits are disposed parallel within the same plane for three phases.

17. The switchgear according to claim 1, wherein the bus side fixed electrode, the intermediate fixed electrode, and the earthing side fixed electrode are linearly disposed, and formed so that the inside diameters thereof are equal to each other, wherein the movable electrode of the air-insulated earthing-and-disconnecting switch comprises a spring contact point slidably contacting the bus side fixed electrode, the intermediate fixed electrode, and the earthing side fixed electrode, wherein the movable electrode of the air insulated earthing-and-disconnecting switch is connected to an operation rod, and wherein the operation rod passes through inward of the inside diameter of the earthing side fixed electrode.

* * * * *